(12) United States Patent
Yntema et al.

(10) Patent No.: US 7,263,201 B2
(45) Date of Patent: Aug. 28, 2007

(54) RECORD CARRIER WITH WATERMARK

(75) Inventors: Gertjan Yntema, Eindhoven (NL); Antonius Jacobus Johannes Werner, Eindhoven (NL); Engelbertus Petrus Gerardus Maria Kramer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 748 days.

(21) Appl. No.: 10/169,922

(22) PCT Filed: Nov. 12, 2001

(86) PCT No.: PCT/EP01/13157

§ 371 (c)(1),
(2), (4) Date: Jul. 10, 2002

(87) PCT Pub. No.: WO02/41316

PCT Pub. Date: May 23, 2002

(65) Prior Publication Data

US 2003/0172276 A1    Sep. 11, 2003

(30) Foreign Application Priority Data

Nov. 14, 2000   (EP) ................................ 00203980
Aug. 28, 2001   (EP) ................................ 01203247

(51) Int. Cl.
*G06K 9/00*   (2006.01)
*G11B 7/24*   (2006.01)

(52) U.S. Cl. .................................. 382/100; 369/275.1

(58) Field of Classification Search ................ 382/100; 369/275.1
See application file for complete search history.

(56) References Cited

U.S. PATENT DOCUMENTS

| | | | |
|---|---|---|---|
| 5,608,717 A * | 3/1997 | Ito et al. ................... | 369/275.3 |
| 5,748,607 A * | 5/1998 | Ohira et al. ............. | 369/275.4 |
| 6,088,323 A * | 7/2000 | Kobayashi et al. ...... | 369/275.3 |
| 6,226,109 B1 * | 5/2001 | Tompkin et al. ............... | 359/2 |
| 6,233,213 B1 * | 5/2001 | Okada et al. ............ | 369/59.12 |
| 6,311,305 B1 * | 10/2001 | Sollish et al. ............... | 714/784 |
| 6,370,319 B1 * | 4/2002 | Matsumoto et al. .......... | 386/94 |
| 6,423,478 B1 * | 7/2002 | Ha .............................. | 430/321 |
| 6,470,089 B2 * | 10/2002 | Ito et al. ..................... | 382/100 |
| 6,553,129 B1 * | 4/2003 | Rhoads ...................... | 382/100 |
| 6,646,967 B1 * | 11/2003 | Garcia ..................... | 369/53.21 |
| 6,735,160 B1 * | 5/2004 | Miyashita et al. ........ | 369/59.12 |
| 6,754,158 B1 * | 6/2004 | Kobayashi et al. ...... | 369/59.11 |
| 7,007,165 B1 * | 2/2006 | Tsuria ........................ | 713/176 |
| 2002/0001277 A1 * | 1/2002 | Thomas ................... | 369/59.21 |
| 2002/0011277 A1 * | 1/2002 | Thomas ................... | 369/59.21 |
| 2002/0146147 A1 * | 10/2002 | Levy .......................... | 382/100 |
| 2004/0161113 A1 * | 8/2004 | Coene et al. ............... | 380/287 |

FOREIGN PATENT DOCUMENTS

WO   WO9808180   2/1998

* cited by examiner

*Primary Examiner*—Matthew C. Bella
*Assistant Examiner*—Utpal Shah
(74) *Attorney, Agent, or Firm*—Michael E. Belk

(57) ABSTRACT

A record carrier includes a pattern of substantially parallel tracks for storing data in the form of marks, in which the data is encoded by a channel code. A watermark is provided by controlling the parameter of the channel code so as to introduce a predetermined run length distribution in the marks on the record carrier. Brightness differences are caused by introducing this run length distribution.

17 Claims, 10 Drawing Sheets

Figure 1:
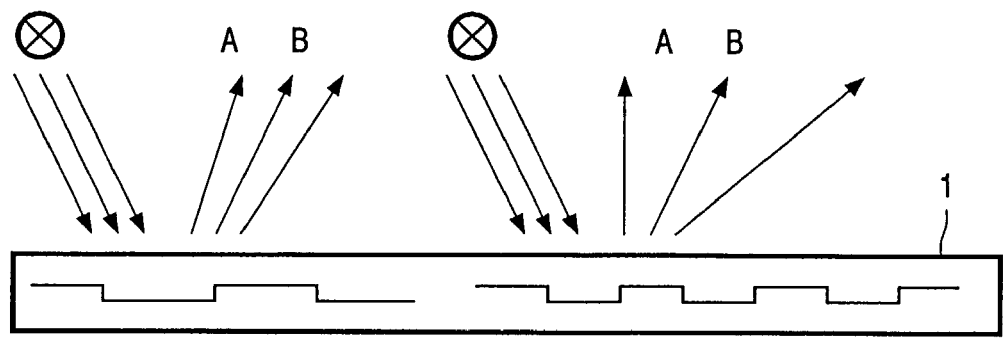

```
Generate-and-test (
    dsv_min, dsv_max,start_sign, t[n],efm_words[n+1],
mergingbit_comb[n]
)
begin
    z_new := n+1;
    solution_found := false;
    for i:=1 to |S|            // number of solutions 4^n
    do
        generate possible solution s(i)ε S;
        if possible solution s(i) is feasible then
            RDS = calculateRDS (
start_sign, efm_words[n+1], mergingbit_comb[n]
            );
            if (Dsv_min <= RDS <= Dsv_max) then
    z := costfunction(t[n],mergingbit_comb[n]);
                if z == 0 then
                    update currentRDS
                    update S0
                exit (success)
                else
                if (z < z_new) then
                    z_new := z;
                    mergingbit_comb_new :=
                    mergingbit_comb;
                    solution_found := true;
                endif
                endif
            endif
        endif
    enddo
```

FIG.3-1

```
        if (solution_found) then
            update currentRDS
            update start_sign
            exit (success)
        else
            Dsv_max:=Dsv_max+2;
            Dsv_min:=Dsv_min-2;
            Generate-and-test (              // recursion
               dsv_min, dsv_max, S0,
               t[n],efm_words[n+1],mergingbit_comb[n]
            );
        endif
end costfunction (t[n],mergingbit_comb[n])
begin
    z := 0;
    for i:=1 to n
    do
            if (t[i] == 0) then
            y = number_of_ones_within(mergingbit_comb[i]);
              else
            y = 1 - number_of_ones_within(mergingbit_comb[i])
              endif
            z := z + y;
    enddo
    return z;
end
```

FIG.3-2

PHILIPS
Centre For
Industrial Technology
Professional Electronics - Applied Algorithms
Visual Watermarking Demonstration CD
CDLDP project
FIG. 9

RECORD CARRIER WITH WATERMARK

The invention relates to a record carrier comprising a pattern of substantially parallel tracks for storing data in the form of marks, in which the data is encoded by means of a channel code, and the record carrier includes a watermark.

The invention also relates to a device for reading a record carrier, a method of providing a watermark on the record carrier, and a device for providing a watermark on a record carrier.

A record carrier of this type is known from U.S. Pat. No. 5,608,717. This document discloses a record carrier having a record surface and a pattern displaying area. The object of the record surface is to store data in the form of pit patterns, which data is encoded by means of a channel code. The object of the pattern displaying area is to store a visually detectable watermark. This watermark is provided by choosing given, different pit patterns whose average optical reflectance mutually differs. In this context, a watermark is understood to mean a mark which is hard to reproduce and remove.

Such a record carrier has the drawback that a part for the pattern displaying area must be reserved on the record carrier, so that less data can be registered on the record carrier. In fact, the patterns placed in the pattern displaying area are not data patterns but specifically selected patterns for providing the visual pattern.

It is an object of the invention to realize a record carrier on which a watermark is provided, without negatively influencing the available data capacity of the record carrier.

According to the invention, this object is achieved by a record carrier which is characterized in that a parameter of the channel code is controlled so as to introduce a predetermined run length distribution in the marks on the record carrier, so that the watermark is detectable on the record carrier. By providing the watermark on the record carrier in this way, it is possible to provide a watermark at the same position as that of the data. Consequently, this watermark is not at the expense of the available data capacity of the record carrier.

The inventors have recognized, inter alia, that it is possible to introduce a predetermined run length distribution in the marks on the record carrier by controlling a parameter of the channel code. This results in differences of brightness which ensure that a watermark is detectable on the record carrier. These brightness differences are caused by the fact that pits with short run lengths reflect light at different angles than pits with longer run lengths. When providing the watermark, the encoded data itself is of course not changed. As it were, the watermark is interwoven in the encoded data.

An embodiment of the record carrier according to the invention is characterized in that the predetermined run length distribution is correlated from track to track, so that the watermark is visually detectable. By correlating the predetermined run length distribution from track to track, it has been found to be possible to provide a visually detectable watermark on a record carrier, i.e. to detect it with the naked eye. It will be evident that such a watermark is much easier to detect than a non-visually detectable watermark. Experiments carried out by the inventors have proved that it is important to know the exact position on the record carrier if it is at all possible to visually provide the desired image on the record carrier.

A word, for example, a trade name may be chosen as a visually detectable watermark. Such a watermark may be used, for example, to indicate the originality of the record carrier. In addition, it is possible to sue a person copying both the information on the record carrier and the visually detectable watermark to another record carrier on grounds of trademark infringement. Moreover, a visually detectable watermark may also have a marketing function because the appearance of a record carrier is positively influenced, for example, by placing an image of the relevant artist in the watermark on a music CD. Moreover, recording of a word on the record carrier may render printing of the upper side of the record carrier superfluous. This reduces the production costs of the record carrier.

A further embodiment of the record carrier according to the invention is characterized in that the watermark is non-visually detectable. In certain cases, it will be preferred to provide a non-visually detectable watermark. A non-visually detectable watermark is understood to mean that the watermark can only be detected with optical detectors. Such a watermark has the advantage that it is not immediately clear that the record carrier is provided with a watermark. Consequently, a possible hacker will have second thoughts about attempting removal of the watermark in one way or another.

A further embodiment of the record carrier according to the invention, in which the channel code is the EFM channel code as used for the CD Digital Audio disc, is characterized in that the parameter is the choice of merging bits. In the CD standard described by the CD Digital Audio record carrier (referred to as the "Red Book") an algorithm is given for choosing merging bit combinations. These merging bits have a dual purpose. They are used for "sticking" the different EFM channel words together and for minimizing the low-frequency content of the signal. This EFM channel code is described in U.S. Pat. No. 4,501,000. Experiments carried out by the inventors have proved that deviations from this algorithm do not immediately lead to a reduced possibility of playing a CD. By deviating from this algorithm, it has been found possible to locally provide run length distribution differences. This resulted in brightness differences which could be used for providing the watermark on the record carrier. Such a record carrier has the further important advantage that the watermark is lost when the data on the record carrier is copied. In fact, a CD player/writer ignores the merging bits which are present between the data on the record carrier because these do not comprise information relating to the data. Even if a bit-by-bit copy of the disc is made, the watermark will disappear in most cases because of the production variations between different record carriers.

A further embodiment of the record carrier according to the invention is characterized in that the parameter is the choice between channel words for information words from alternative tables, for example, information words 1 up to and including 88 in the EFM+ channel code as used in DVD, or the choice between sync words or the choice between states. It has been found possible for, for example, the EFM+ channel code to modify the run length distribution of the encoded data in such a way that a watermark can be provided. This channel code is described in European patent specification EP 0 745 254 B1. It is, for example, possible to change the run length distribution by the choice of the channel word for information words 1 up to and including 88. It is also possible to change the run length distribution by the choice of sync words or encoding states.

A further embodiment of the record carrier according to the invention is characterized in that the parameter is the choice between channel words for information the record carrier has two areas, in which a parameter of the channel code is controlled in a first area for introducing a predetermined run length distribution in the marks on the record carrier, so that the watermark is detectable on the record carrier, while no watermark is present in a second area.

The invention also relates to a device for reading a record carrier, the device comprising a system for detecting marks via a light spot on the record carrier, and tracking means for controlling the position of the light spot, and is characterized in that the device comprises detection means for determining a property of the run length distribution of the marks on the record carrier for detecting a watermark. This device according to the invention provides the possibility of detecting a watermark on a record carrier, in which the watermark has been introduced on the record carrier by providing a given run length distribution in the marks on the record carrier.

An embodiment of this device is characterized in that the detection means are further adapted to determine a property of the run length distribution of marks which do not represent data encoded in accordance with a channel code. This device according to the invention has the advantage that it can determine both the run length distribution of marks representing data and the run length distribution of marks not representing data.

A further embodiment of this device is characterized in that the detection means comprises a run length counter. This run length counter provides the possibility of determining the run length distribution of the encoded data. This information may be used for detecting the watermark which may be present on the record carrier. In a further embodiment of this device, the device comprises means for allowing read-out of the record carrier dependent on whether the watermark is detected or not detected.

The invention also relates to a method of providing a watermark on a record carrier, the method comprising the steps of:

receiving uncoded data, receiving information about the watermark which is to be provided in the encoded data, encoding the uncoded data to encoded data by means of a channel code, in which a parameter of the channel code is controlled under the influence of the information about the watermark for introducing a predetermined run length distribution in the marks on the record carrier, so that the watermark is detectable on the record carrier, storing the encoded data on the record carrier.

In an embodiment of this method, this method comprises the further step of:

computing the merging bits on the basis of the information about the watermark.

The invention further relates to a device for providing a watermark on a record carrier, the device comprising receiving means for receiving uncoded data, the receiving means being further adapted to receive information about the watermark which is to be provided in the encoded data, the device further comprising encoding means for encoding the uncoded data to encoded data by means of a channel code, in which a parameter of the channel code is controlled under the influence of the information about the watermark for introducing a predetermined run length distribution in the marks on the record carrier, so that a watermark is detectable on the record carrier, the device further comprising means for storing the encoded data on the record carrier.

These and other aspects of the invention are apparent from and will be elucidated with reference to the embodiments described hereinafter.

Figure 2A:
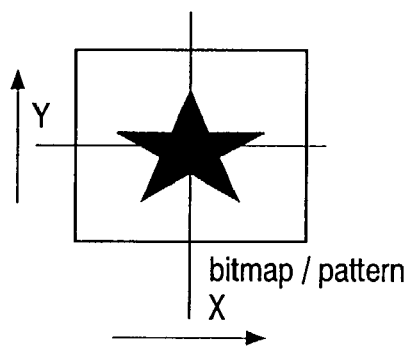
Figure 2B:
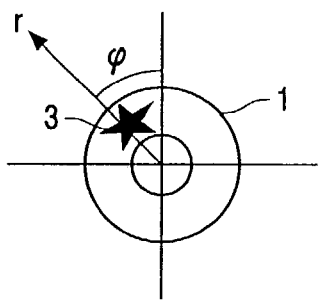
Figure 2C:
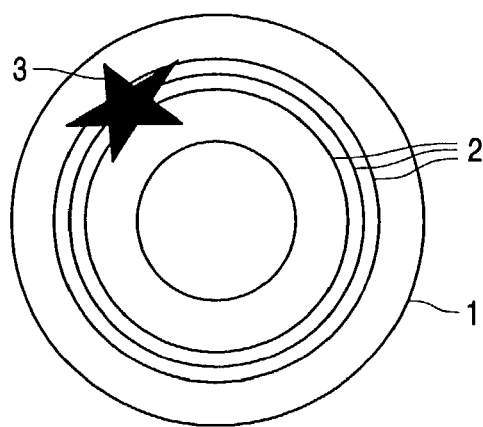
Figure 4:
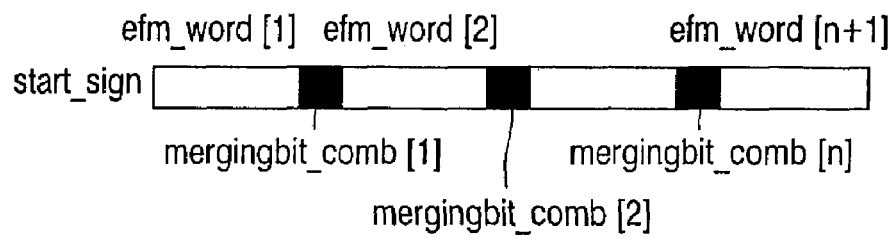
Figure 5:
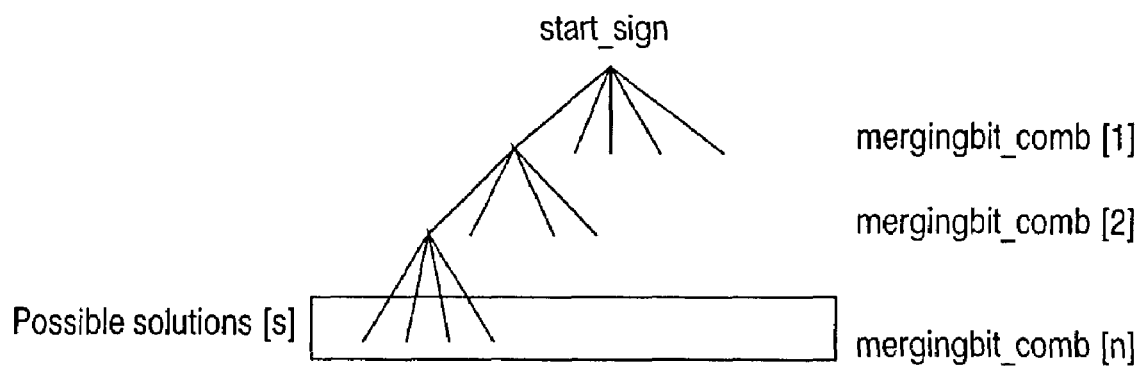
Figure 6:
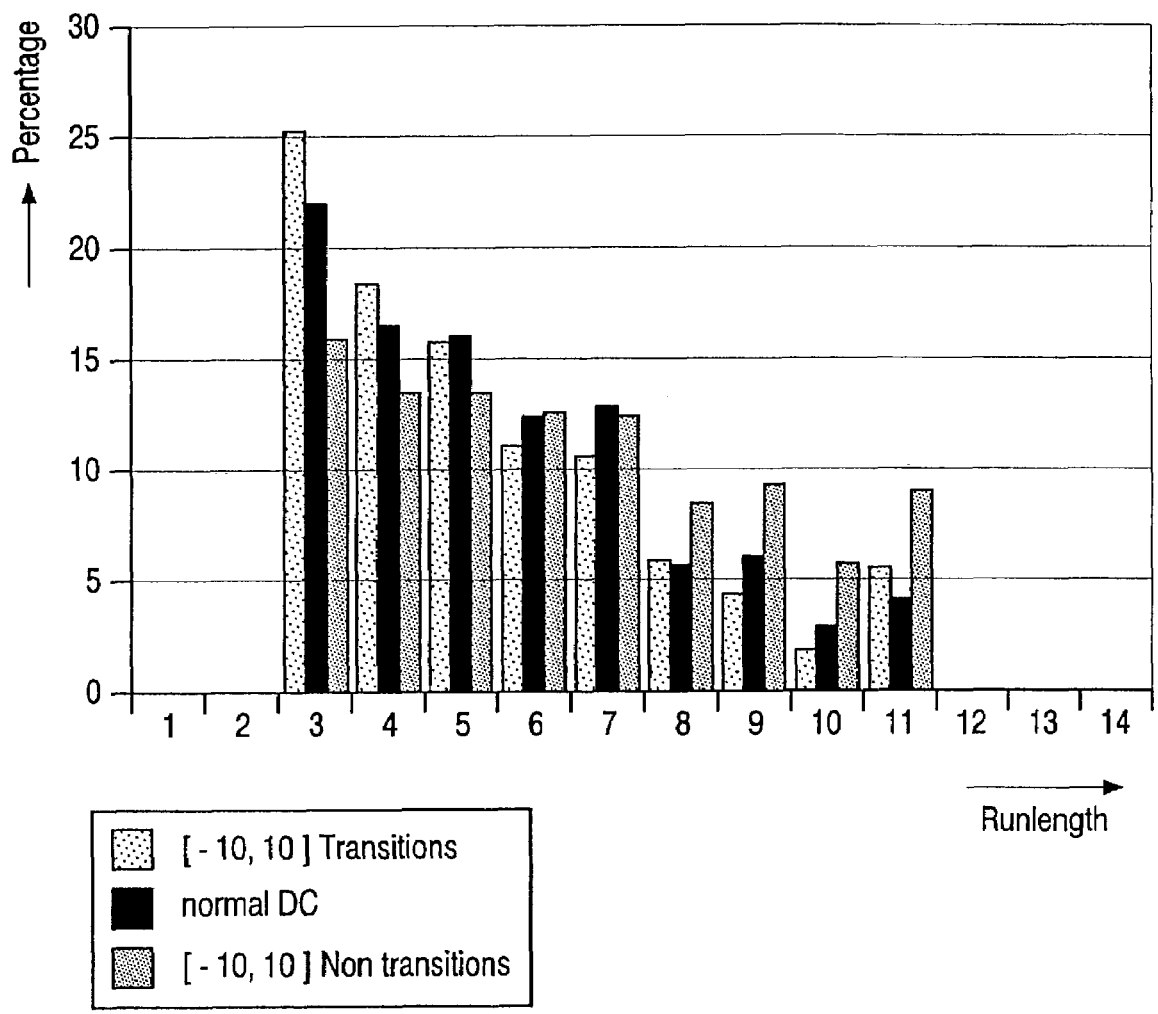
Figure 7:
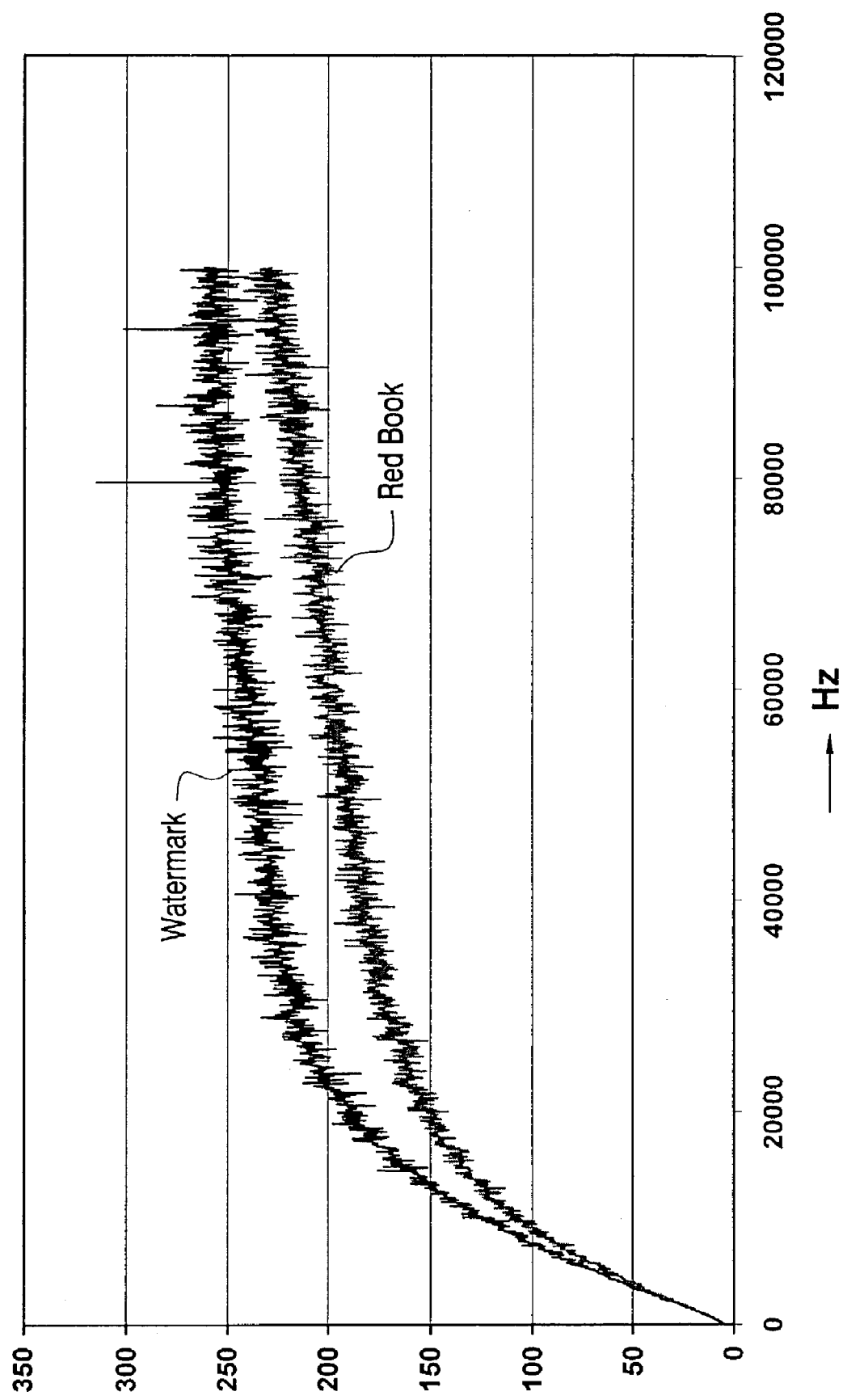
Figure 8:
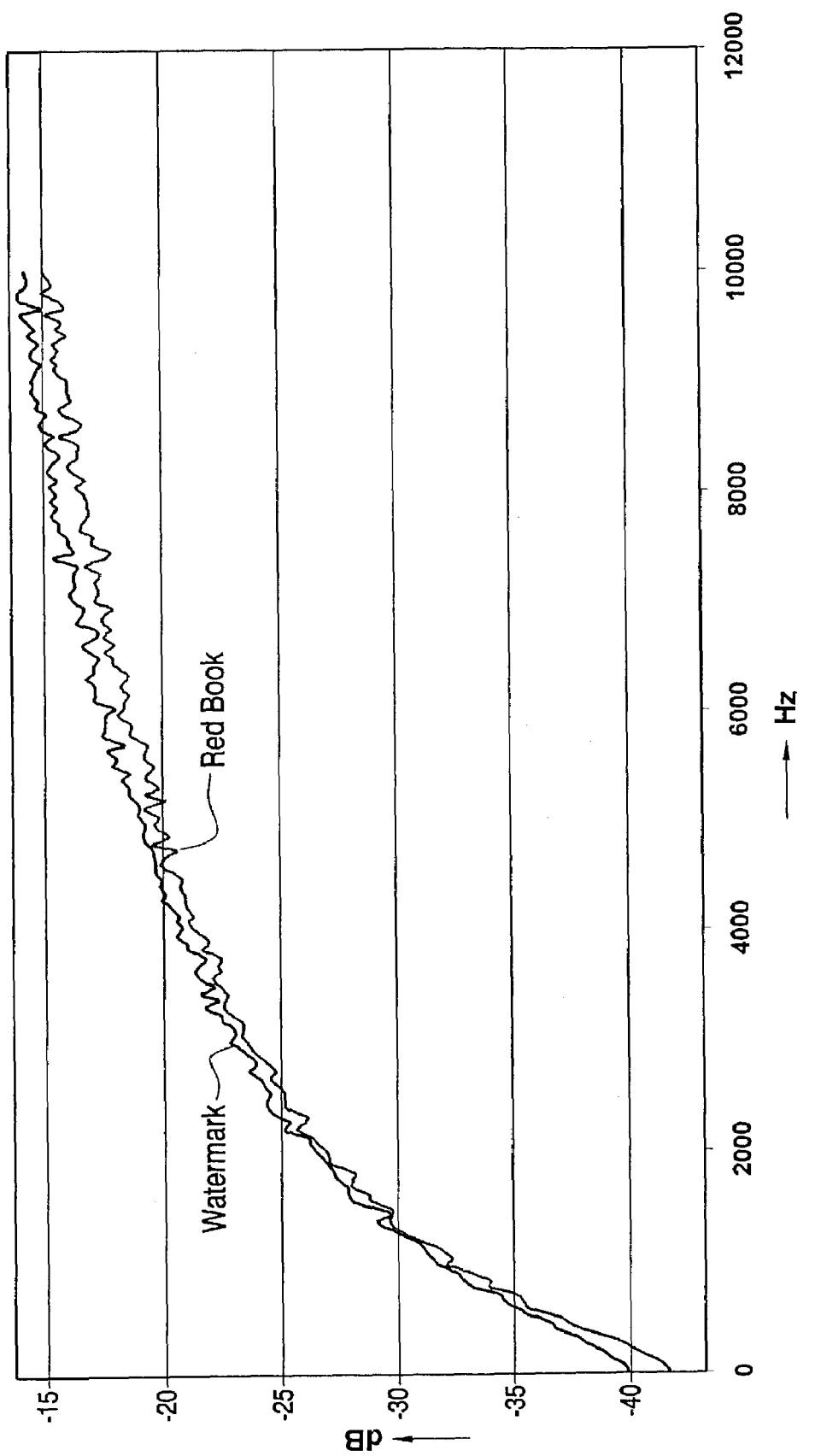
Figure 10:
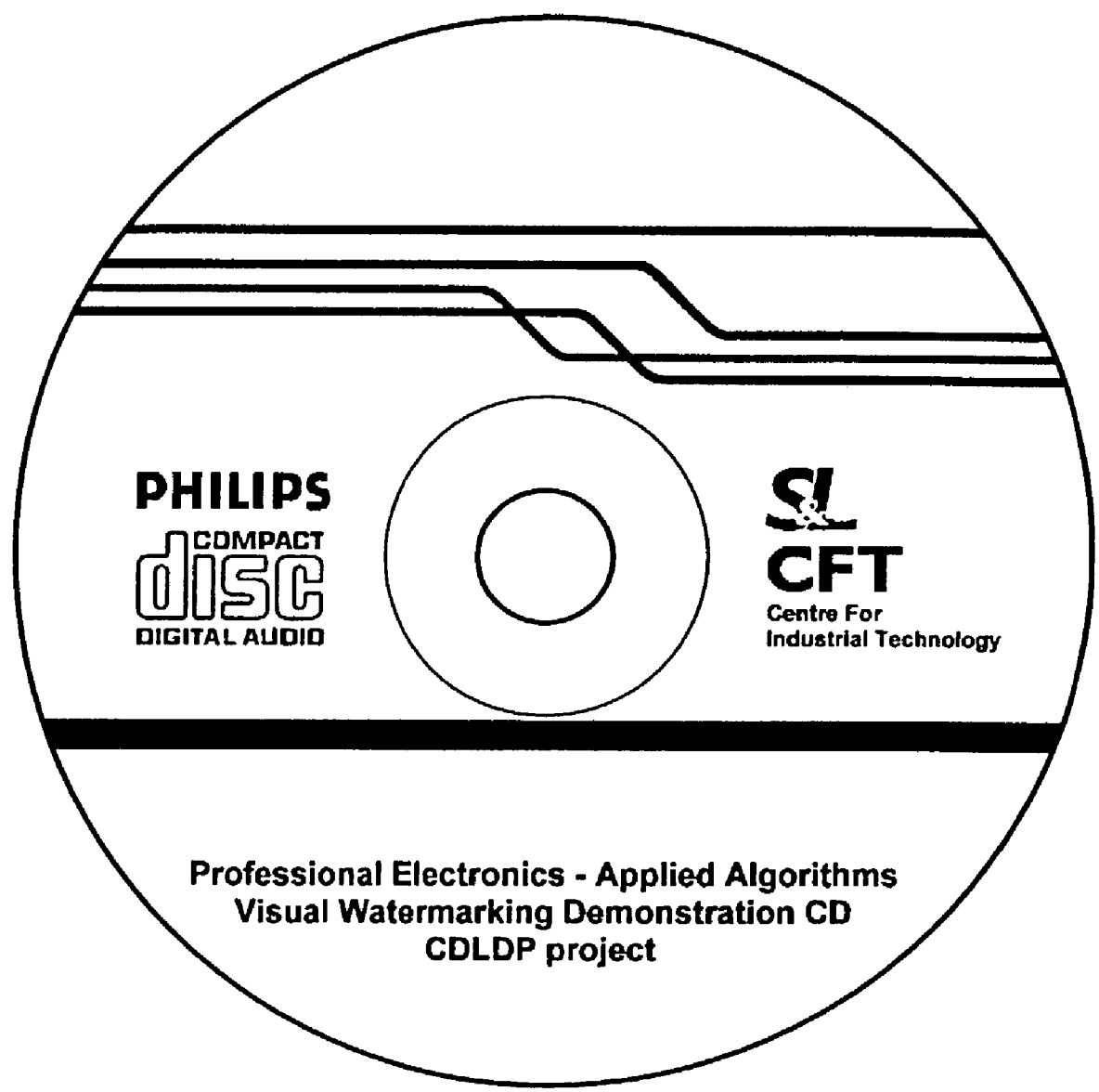
Figure 11:
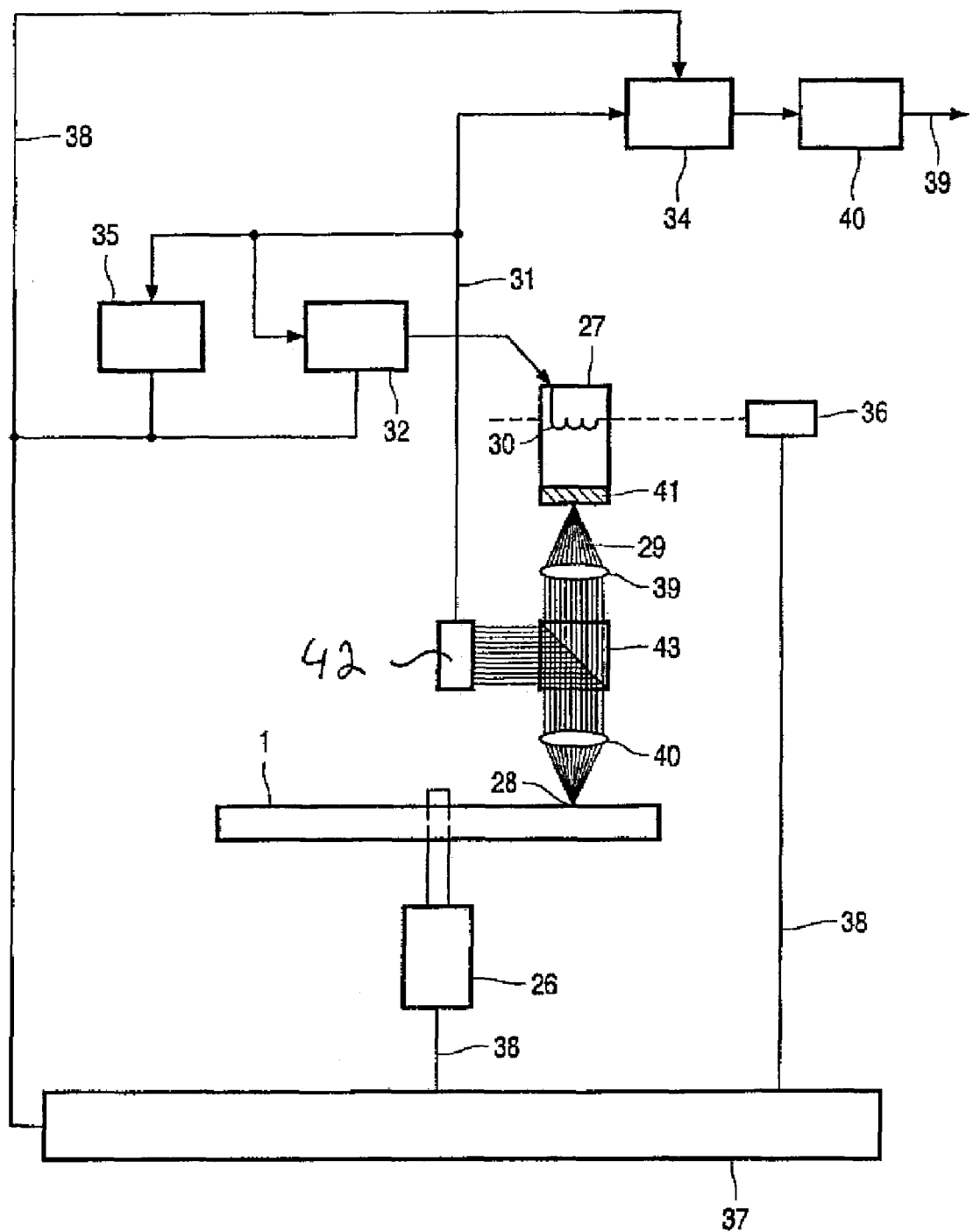

In the drawings:

FIG. 1 shows the reflection of light by pits having short run lengths and pits having long run lengths, FIG. 2a shows a watermark in (x,y) co-ordinates, FIG. 2b shows a watermark in (r,φ) co-ordinates, FIG. 2c is an enlargement of the watermark shown in FIG. 2b, FIG. 3 shows the code of an algorithm for computing the optimum choice of merging bits, FIG. 4 shows the positioning of the merging bits between the EFM channel words, FIG. 5 shows a decision tree for determining the optimum choice of merging bits, FIG. 6 is a graph showing the standard run length distribution of the CD-DA disc and the run length distributions changed by means of the algorithm, FIG. 7 is a graph showing the spectral density of a record carrier with and without a watermark, FIG. 8 shows an enlargement of the graph of FIG. 7, FIG. 9 shows an example of a watermark, FIG. 10 shows the example of the watermark of FIG. 9 on a record carrier, FIG. 11 shows a device for reading a record carrier.

FIG. 1 shows the reflection of light by pits having short run lengths and pits having long run lengths. By providing a predetermined run length distribution, it is possible to realize a difference of brightness on the record carrier. As already stated, this difference of brightness is caused by the fact that light is reflected differently by different run lengths. For a disc having short run lengths (=high frequencies), the light is reflected at a larger angle than for a disc having long run lengths (=low frequencies). This is shown diagrammatically in FIG. 1. FIG. 1 shows a record carrier 1 reflecting light from a light source. The quantity of light at positions A and B is subsequently checked. The effect at point A is as follows: a relatively small quantity of light comes from the locations on the disc with short run lengths, whereas a relatively large quantity of light comes from the locations on the disc with long run lengths. The effect at point B is now as follows: a relatively small quantity of light comes from the locations on the disc with long run lengths, whereas a relatively large quantity of light comes from the locations on the disc with short run lengths.

When the same run length distribution is aimed at for a given part of the record carrier, there will be a visual effect, a visually detectable watermark. For smaller surfaces (for example, one track) the run length distribution in situ is not visible to the eye but can be detected by a detector at the information level. To create a visually detectable watermark, the run length distribution should be correlated from track to track. The exact position, expressed in (x,y) co-ordinates or (r,φ) co-ordinates on the record carrier must thus be known. FIG. 2a shows a watermark in (x,y) co-ordinates. FIG. 2b shows a watermark 3 in (r,φ) co-ordinates. FIG. 2c shows an enlargement of the watermark 3 of FIG. 2b. This enlargement shows that the watermark 3 extends through a plurality of tracks 2. For determining the exact position on the record carrier 1, a given (x,y) position in the watermark in FIG. 2a is converted to the associated (r,φ) position in the watermark in FIG. 2b,c.

It is alternatively possible to convert each (x,y) position to an expression of this position in a sine/cosine representation. To reduce the amount of computing time, it is also possible to divide the record carrier into, for example, 1000 concentric circles and to compute per circle where the watermark is to be positioned. Since a CD has approximately 20,000 tracks, this means that a computation at a given point should be made per 20 tracks.

The exact channel bits forming part of the watermark to be provided are computed by means of the (r,φ) position. To localize these channels bits, the number of channel bits per revolution must also be known. Experiments have proved that the CLV (Central Linear Velocity) of the record carrier, the pitch (the distance between consecutive tracks on the record carrier) and the start diameter of the writing area of a record carrier must be known very accurately or should be computed. It was found that the (CLV*pitch) with an accuracy of 1E-6 and the start diameter and the stop diameter must be known with an accuracy of 1.6 µm if it is to be possible to provide the visually detectable watermark on a CD-DA disc.

By providing the watermark at a fixed position on the record carrier, it can be prevented that the watermark is copied by a bit-by-bit copy. In a device for reading the record carrier, it can then be detected, for example, by means of a tacho signal whether the watermark is always measured at the same corner of the disc. In fact, it has been found that it is substantially impossible in the case of a bit-by-bit copy to ensure that a given channel bit in the copy will occupy exactly the same position on the disc as on the master copy.

Merging bits are used, inter alia, in the channel code of the CD Digital Audio disc. As previously stated, these merging bits have a dual purpose. They are used for "sticking" the different EFM channel words together and for minimizing the low-frequency content of the signal. To control this low-frequency content of the signal, the RDS (Running Digital Sum) value is kept within given limits. This is referred to as DC control (DC stands for Direct Current in this case). This RDS value indicates whether more channel bits of the value "0" or the value "1" occur in the signal. By keeping the RDS value around zero as much as possible, it is ensured that the low-frequency content of the signal remains sufficiently small. The choice of the merging bits influences the RDS value because it is possible to introduce an extra transition in the signal by a given choice of the merging bits. The Red Book proposes an algorithm in which one looks ahead by one EFM word for minimizing the DC content of the signal.

The inventors have found that a correct choice of the merging bits provides the possibility of providing a visually detectable watermark on the CD-DA disc and exerting sufficient DC control. In a first embodiment, this is realized by the following simple algorithm. For areas which should become light, a merging bit combination with a transition is chosen, for areas which should become dark, a merging bit combination without a transition is chosen. When a choice is made for a merging bit combination with a transition and when there are more possibilities, the merging bit combination resulting in the lowest RDS value is chosen. When the RDS value exceeds a predetermined maximum at a given moment, the merging bit combination which results in the lowest RDS is always chosen, even if this should be at the expense of the contrast of the visual watermark. Experiments on the record carrier with a watermark provided in accordance with this algorithm proved that the possibility of playing the record carrier was hardly affected. However, the low-frequency content of the signal (represented by the "notch" in the channel bit spectrum) appeared to be larger than the low-frequency content of a signal on a standard CD-DA disc in accordance with the Red Book.

A second embodiment is based on "n symbol look-ahead" and uses Linear Programming techniques. This algorithm provides the possibility of creating both a watermark with a good contrast and a good channel bit spectrum. This spectrum is comparable with the spectrum which is obtained by the "one symbol look-ahead" algorithm which is used in the EFM channel coding in accordance with the Red Book. FIG. 3 shows the code of an algorithm for computing the optimum choice of merging bits. This code is a simple implementation of the use of Linear Programming techniques for computing the correct merging bit combinations. In every iteration, all possible merging bit combinations are generated and tested, yielding an optimal result. In other words, all of the four possible merging bit combinations are selected and the DSV value and the contrast of the watermark is computed for each combination. Subsequently, the combination is chosen that ensures a DSV value within the indicated limits and a maximal contrast of the watermark, while the run length constraints imposed by the channel code continue to be satisfied (in the case of the EFM channel code, this is a k constraint of 2 and a d constraint of 10).

This algorithm will be elucidated with reference to FIGS. 4 and 5. FIG. 4 shows the positioning of the merging bits between the EFM channel words. FIG. 5 shows a decision tree for determining the optimal choice of merging bits. In FIG. 5, the decision tree has a depth of three, i.e. three EFM words are looked ahead in determining the optimal merging bit combination, which is referred to as "3 symbol look-ahead". Consequently, there are 64 (=4×4×4) possible merging bit combinations. The algorithm generates all of the 64 possibilities and computes which possibilities are allowed on the basis of the constraint imposed on the channel code and which subsequently ensure a DSV value within the indicated limits and a maximal contrast of the watermark. A plurality of parameters is used in the algorithm. They have the following meaning:

possible solution: any possible merging bit combination without taking the constraints into account.

possible solution is feasible: a merging bit combination for which the constraints imposed on the channel code are satisfied.

t[n]: indicates whether a transition or a non-transition is desired.

number_of_ones_within: indicates the number of "zeros" in a given merging bit combination.

calculate RDS:computes the RDS value based on the parameter "start_sign" and the computed merging bit combinations. The last EFM word has the index n.

FIGS. 6, 7 and 8 are graphs showing the run length distribution and the spectral density of a signal computed in accordance with the algorithm described above. FIG. 6 is a graph showing the standard run length distribution of the CD-DA disc (normal DC) and run length distributions changed by means of the algorithm. The Figure shows the run length distribution ([−10,10] Transitions) changed by means of the algorithm, in which the changed run length distribution has a larger number of short run lengths, and the run length distribution ([−10,10] Non-transitions) changed by means of the algorithm, in which the changed run length distribution has a larger number of long run lengths. This Figure indicates the situation in which the RDS value was maintained within the interval [−10,10].

In the case of "[−10,10] Transitions", this means that merging bit combinations are chosen which provide transitions (as much as possible) so that there will be more short run lengths than long run lengths. If there is a risk that the RDS value is beyond the interval, a merging bit combination is chosen which ensures that the RDS value remains within the interval. The fact that such a choice leads to a larger number of short run lengths is shown in FIG. 6 (particularly for run lengths of 3 and 4). For determining the possible merging bit combinations, 3 EFM words were looked ahead in this case ("3 symbol look-ahead").

In the case of "[−10,10] Non-transitions", it is ensured by choosing non-transitions in allowed cases (in cases where the RDS value does not fall beyond the indicated interval) that a larger number of long run lengths occurs in the signal. The fact that such a choice leads to a larger number of long run lengths can be seen in FIG. 6 (particularly for run lengths of 8, 9, 10 and 11). Also in this case, use is made of "3 symbol look-ahead".

By adapting the magnitude of the RDS value, it is possible to find the desired balance between the DC control and the contrast of the watermark. In the case of an interval [−5,5], the low-frequency signal content of the resulting signals will become smaller (improved DC control), but the contrast of the watermark will also be reduced because a merging bit combination ensuring a large contrast will not be chosen in a larger number of cases, but a merging bit combination will be chosen which ensures that the RDS value remains within the imposed interval. It has been found that the "spectral notch" becomes wider when the interval is reduced.

Instead of looking ahead by a number of EFM words so as to compute the resultant RDS for any possible merging bit combination, it is alternatively possible to look ahead by a large number of EFM words and compute the associated spectral density for determining the most suitable merging bit combinations.

FIG. 7 is a graph showing the spectral density of a record carrier with and without a watermark. FIG. 8 is an enlargement of the graph of FIG. 7, showing the spectral density in dB. In this case, the watermark is introduced on the record carrier by making use of transitions and non-transitions, in which the RDS value had to remain within an interval of [−5,5]. This means that the number of short run lengths is chosen to be, for example, larger at positions where a watermark is to be provided, whereas an increase of the number of long run lengths is chosen at positions where no watermark is to be provided. This is in contrast to the situation in FIG. 6 in which a choice was made for changing the run length distribution at positions where a watermark is to be provided, whereas the run length distribution is not changed at positions where no watermark is to be provided. In this way, it is possible to increase the contrast of the watermark to be provided.

It appears from FIG. 7 that the spectrum of the signal on the record carrier with a watermark largely corresponds to the spectrum of the signal on the record carrier without a watermark. This particularly applies to the spectrum at low frequencies, as can be seen in FIG. 8.

FIG. 9 shows an example of a watermark, while FIG. 10 shows this watermark example on a record carrier. The inventors have succeeded in providing this watermark on a compact disc, in which [−5,5] was chosen as RDS interval.

The invention does not only relate to a record carrier provided with a watermark and a method of providing a watermark, but also relates to a device for reading a record carrier with a watermark. FIG. 11 shows such a device. The device is equipped with drive means 26 for rotating the record carrier 1, and a read head 27 for reading the tracks on the record carrier. The read head 27 comprises an optical system of a known type, intended to generate a light spot 28 focused on a track of the record carrier by means of a light beam 29 which is passed through optical elements such as a collimator lens 39 for collimating the light beam, and an objective lens 40 for focusing the light beam. This light beam 29 is generated by a radiation source 41, for example, an infrared laser diode having a wavelength of 780 nm and an optical power of 3 mW. The read head 27 further comprises an actuator intended to focus the light beam 29 on the record carrier, and a tracking actuator 30 for fine-positioning of the light spot 28 in the radial direction in the center of the track. The track can also be followed by the laser beam by varying the position of the objective lens 40. After having been reflected by the record carrier, the light beam 29 is detected by a detector 42 of a known type, for example, a quadrant detector, and generates detector signals 31 including a read signal, a tracking error signal, a focus error signal, a synchronization signal and a lock-in signal. For this purpose, use can be made of, for example, a beam-splitting cube 43, a polarizing beam-splitting cube, a pellicle or a retarder. The device is equipped with tracking means 32 coupled to the read head 27 for receiving the tracking error signal from the read head 27 and for controlling the tracking actuator 30. The detector signals 31 are applied to detection means 34 for detecting a watermark which may be present on the record carrier to be read. The detection means 34 may be constituted, for example, as a run length counter for determining the run length distribution of the data. The watermark can be detected on the basis of this distribution.

In a simple embodiment of a run length counter, the run length counter counts the number of run lengths with length I3. By introducing a different number of run lengths with length I3 for different parts on the record carrier (by suitable choice of merging bit combinations), it is possible to provide a key on the record carrier. The device can detect this key by comparing the occurrence of the number of run lengths with length I3 at different positions.

After possible detection of the watermark, the read signal is applied to means 40 adapted to allow read-out of the record carrier, dependent on whether the watermark is detected or not detected. After these means 40, the read signal is converted to output information 39 when the record carrier may be read. The device is provided with an address detector 35 for detecting address information, and positioning means 36 for coarse-positioning of the read head 27 in the radial direction of the track. The device is further provided with a system control unit 37 for receiving commands from a controlling computer system or from a user, and for controlling the device by means of control lines 38, for example, a system bus connected to the drive means 26, the positioning means 36, the address detector 35, the tracking means 32 and the detection means 34. To this end, the system control unit 37 comprises a control circuit, for example, a microprocessor, a program memory and control ports for performing the procedures as described below. The system control unit 37 may also be implemented in a state machine in logic circuits.

Although the invention has been elucidated with reference to the embodiments described above, it will be evident that other embodiments may be alternatively used to achieve the same object. Any parameter of the channel code which provides the possibility of changing the run length distribution may be used to provide a watermark on a record carrier according to the invention. The invention is not limited to compact discs on which a watermark has been provided, but may also be used on CD-R, CD-RW or DVD discs and any other optical record carrier in which a parameter of the channel code can be used for providing a watermark. Furthermore, the invention is considered to reside in any novel characteristic feature and/or combination of characteristic features.

The invention claimed is:

1. A record carrier comprising a pattern of substantially parallel tracks for storing data in the form of marks, in which the data is encoded by means of a channel code and the record carrier includes a watermark, wherein a parameter of the channel code is controlled so as to introduce a predetermined run length distribution in the marks on the record carrier, so that the watermark is detectable on the record carrier, wherein the channel code is the EFM channel code as used for the CD Digital Audio disc, wherein the parameter is the choice of merging bits.

2. The record carrier as claimed in claim 1, wherein the predetermined run length distribution is correlated from track to track, so that the watermark is visually detectable.

3. The record carrier as claimed in claim 1, wherein the watermark is non-visually detectable.

4. The record carrier as claimed in claim 1, wherein the record carrier has two areas, in which the parameter of the channel code is controlled in a first area for introducing the predetermined run length distribution in the marks on the record carrier, so that the watermark is detectable on the record carrier, while no watermark is present in a second area.

5. A record carrier comprising a pattern of substantially parallel tracks for storing data in the form of marks, in which the data is encoded by means of a channel code and the record carrier includes a watermark, wherein a parameter of the channel code is controlled so as to introduce a predetermined run length distribution in the marks on the record carrier, so that the watermark is detectable on the record carrier, wherein the parameter is the choice between channel words for information words from alternative tables, for example, information words 1 up to and including 88 in the EFM+ channel code as used in DVD, or the choice between sync words or the choice between states.

6. A device for reading a record carrier, the device comprising:
a system for detecting marks associated with a watermark via a light spot on the record carrier,
tracking means or controlling the position of the light spot, and
detection means or determining a property of a run length distribution of the marks on the record carrier for detecting the watermark formed by choosing merging bits based on information about the watermark.

7. The device as claimed in claim 6, wherein the detection means are further adapted to determine a property of the run length distribution of marks which do not represent data encoded in accordance with a channel code.

8. The device as claimed in claim 6, wherein the detection means comprises a run length counter.

9. The device as claimed in claim 7, further comprising means for allowing read-out of the record carrier dependent on whether the watermark as detected or not detected.

10. A method of providing a watermark on a record carrier, the method comprising the acts of:
receiving uncoded data,
receiving information about the watermark which is to be provided in the encoded data,
encoding the uncoded data to encoded data by means of a channel code, in which a parameter of the channel code is controlled under the influence of the information about the waterpark for introducing a predetermined run length distribution in the marks on the record carrier,
storing the computer data on the record carrier, and
computing merging bits on the basis on the information about the waterpark.

11. The method as claimed in claim 10, wherein the encoding act comprises correlating the predetermined run length distribution from track to track, so that the watermark is visually detectable.

12. The method as claimed in claim 10, wherein the record carrier has two areas, in which the parameter is controlled in a first area for introducing the predetermined run length distribution in the marks on the record carrier, so that the watermark is detectable on the record carrier, while no watermark is present in a second area.

13. A device for providing a watermark on a record carrier, the device comprising:
receiving means for receiving uncoded data, the receiving means being further adapted to receive information about the watermark which is to be provided in the encoded data,
encoding means for encoding the uncoded data to encoded data by means of a channel code, in which a parameter of the channel code is controlled under the influence of the information about the watermark for introducing a predetermined run length distribution in the marks on the record carrier, so that the watermark is detectable on the record carrier, and
means for storing the encoded data on the record carrier, wherein the watermark is formed by merging bits on the basis of the information about the watermark.

14. The device as claimed in claim 13, wherein the predetermined run length distribution is correlated from track to track, so that the watermark is visually detectable.

15. The device as claimed in claim 13, wherein the record carrier has two areas, in which the parameter of the channel code is controlled in a first area for introducing the predetermined run length distribution in the marks on the record carrier, so that the watermark is detectable on the record carrier, while no watermark is present in a second area.

16. A device for providing a watermark on a record carrier, the device comprising:
receiving means for receiving uncoded data, the receiving means being further adapted to receive information about the watermark which is to be provided in the encoded data; and
encoding means for encoding the uncoded data to encoded data by means of a channel code, in which a parameter of the channel code is controlled under the influence of the information about the watermark for introducing a predetermined run length distribution in the marks on the record carrier, so that a watermark is detectable on the record carrier;
wherein the parameter is the choice between channel words for information words from alternative tables, including information words 1 up to and including 88 in the EEM+ channel code as used in DVD, or the choice between sync words or the choice between states.

17. A method of providing a watermark on a record carrier, the method comprising the acts of:
receiving uncoded data;
receiving information about the watermark which is to be provided in the encoded data;
encoding the uncoded data to encoded data by means of a channel code, in which a parameter of the channel code is controlled under the influence of the information about the watermark for introducing a predetermined run length distribution in the marks on the record carrier, so that the watermark is detectable on the record carrier; and storing the encoded data on the record carrier, wherein the encoding act comprises choosing the parameter between channel words for information words from alternative tables, including information words 1 up to and including 88 in the EFM+ channel code as used in DVD, or the choice between sync words or the choice between states.

\* \* \* \* \*